US008100999B2

(12) United States Patent
Ashbee et al.

(10) Patent No.: US 8,100,999 B2
(45) Date of Patent: Jan. 24, 2012

(54) SEPARATING APPARATUS FOR A CLEANING APPLIANCE

(75) Inventors: Giles Ashbee, Malmesbury (GB); James Dyson, Malmesbury (GB)

(73) Assignee: Dyson Technology Limited, Malmesbury (GB)

( * ) Notice: Subject to any disclaimer, the term of this patent is extended or adjusted under 35 U.S.C. 154(b) by 304 days.

(21) Appl. No.: 12/615,875

(22) Filed: Nov. 10, 2009

(65) Prior Publication Data

US 2010/0132319 A1 Jun. 3, 2010

(30) Foreign Application Priority Data

Nov. 28, 2008 (GB) .................................. 0821827.3
Feb. 11, 2009 (GB) .................................. 0902199.9

(51) Int. Cl.
*B01D 45/12* (2006.01)

(52) U.S. Cl. ............. 55/343; 55/429; 55/433; 55/459.1; 55/DIG. 3; 15/350; 15/353

(58) Field of Classification Search .................... 55/343, 55/429, 433, DIG. 3; 15/350, 353
See application file for complete search history.

(56) References Cited

U.S. PATENT DOCUMENTS 7,996,956 B2 * 8/2011 Wood et al. ..................... 15/347
2005/0241284 A1 11/2005 Yoshida et al.

FOREIGN PATENT DOCUMENTS

| | | |
|---|---|---|
| GB | 2 372 434 | 8/2002 |
| GB | 2 448 915 | 11/2008 |
| JP | 2003-19095 | 1/2003 |
| JP | 2005-261963 | 9/2005 |
| WO | WO-02/067742 | 9/2002 |
| WO | WO-02/067752 | 9/2002 |

OTHER PUBLICATIONS

International Search Report and Written Opinion mailed May 25, 2010, directed to corresponding International Patent Application No. PCT/GB2009/051478; 12 pages.
GB Search Report dated Apr. 29, 2009, directed to GB Patent Application No. 0902199.9; 1 page.

* cited by examiner

*Primary Examiner* — Robert A Hopkins
(74) *Attorney, Agent, or Firm* — Morrison & Foerster LLP

(57) ABSTRACT

A separating apparatus for a cleaning appliance, such as a vacuum cleaner, includes a separator for separating dirt and dust from a fluid flow and a collecting chamber arranged to collect dirt and dust separated by the separator. A first catch for opening a closure member on the collecting chamber is provided, with first releasing means for releasing this catch. There is also provided a second catch for releasing the collecting chamber from the separator and second releasing means for releasing the second catch. The second releasing means is inaccessible when the first catch is engaged. A cover associated with the first releasing means obscures the second releasing means until the first catch has been released. The invention prevents the user from accidentally releasing the collecting chamber from the separator when it was the user's intention simply to empty dirt and dust from the collecting chamber.

16 Claims, 11 Drawing Sheets

SEPARATING APPARATUS FOR A CLEANING APPLIANCE

REFERENCE TO RELATED APPLICATIONS

This application claims the priority of United Kingdom application No. 0902199.9, filed Feb. 11, 2009 and GB0821827.3, filed Nov. 28, 2008, the entire contents of which are incorporated herein by reference.

FIELD OF THE INVENTION

The present invention relates to separating apparatus for a cleaning appliance such as a vacuum cleaner.

BACKGROUND OF THE INVENTION

Vacuum cleaners which utilise cyclonic separators are known. In a typical cyclonic vacuum cleaner, an airflow in which dirt and dust is entrained enters a first cyclonic separator via a tangential inlet which causes the airflow to follow a spiral or helical path within a collecting chamber. This causes dirt and dust to be separated from the airflow. Relatively clean air passes out of the chamber while the separated dirt and dust is collected therein. In some appliances, the airflow is then passed to a second cyclonic separator stage which is capable of separating finer dirt and dust than the first cyclonic separator. This fine dirt and dust is typically also collected in the collecting chamber. The cleaned airflow then exits the collecting chamber.

The absence of a bag in a cyclonic vacuum cleaner can create difficulties for the disposal of the dirt and dust which is collected by the cleaner. When the collecting chamber of a cyclonic vacuum cleaner becomes full, a user typically removes the collecting chamber from the main body of the machine and tips the collecting chamber upside down. Often it may be necessary for the user to dislodge the dirt manually, which can be inconvenient.

An improved separating apparatus is disclosed in EP 1370172 and is shown in FIGS. 1*a* and 1*b*. The separating apparatus 1 comprises a separator 2 and a collecting chamber 3. In the illustrated separator 2, airflow passes through a first separation stage 4 and then a second separation stage 5 which comprises a set of tapered cyclonic chambers arranged in parallel with one another. Dirt which is separated by the first 4 and second 5 cyclonic stages collects at the bottom of the chamber 3, against its base 6. The base 6 is pivotably attached, by means of a hinge, to the cylindrical wall that makes up the sides of the chamber 3. The base 6 is held firmly closed by means of a first catch 7, which is operable by the user by means of a trigger 8. When the user operates the trigger 8, the base 6 swings open and the material in the collector falls out of the collecting chamber 3.

It is also useful to be able to remove the collecting chamber 3 from the separator 2. To this end, a second catch 9 is provided. When the user operates the second catch 9, the collecting chamber 3 and separator 2 may be disengaged from each other so that the user may, for example, clear large blockages from the separating apparatus or clean the interior of the collecting chamber.

A problem which may be encountered with this type of arrangement is that the user may inadvertently operate the wrong catch. For example, the user may operate the second catch 9 instead of the first catch 7 so that, even though the user intends only to open the base of the collecting chamber for emptying, the entire collecting chamber may come away from the separator. This can be frustrating and confusing for the user and may result in dirt and dust spilling out of the collecting chamber. It is desirable that the user is able to empty the collecting chamber in an efficient and hygienic manner.

SUMMARY OF THE INVENTION

The invention provides a separating apparatus comprising a separator for separating dirt and dust from a fluid flow and a collecting chamber arranged to collect dirt and dust separated by the separator, a first catch for opening a closure member on the collecting chamber, first releasing means arranged to be capable of releasing the first catch, a second catch for releasing the collecting chamber from the separator and second releasing means arranged to be capable of releasing the second catch, in which the second releasing means is inaccessible when the first catch is engaged By presenting the user with only one releasable catch at a time, the user automatically operates those catches in the correct sequence—namely the catch for releasing the closure member and emptying dirt from the separating apparatus, followed by the catch for releasing the collecting chamber from the separator, if required. The invention prevents the user from accidentally releasing the collecting chamber from the separator when it was the user's intention simply to empty dirt and dust from the collecting chamber.

Preferably, the second releasing means is at least partially obscured when the first catch is engaged, so that the user is not confused by being presented with more than one catch.

Advantageously, the second releasing means is made inaccessible and/or is obscured by the first releasing means. The first releasing means may be arranged to move from a first position, in which the first releasing means obscures the second releasing means, to a second position in which the second releasing means is accessible and visible.

Alternatively, the second releasing means may be made inaccessible, and/or is obscured by, part of the collecting chamber, such as the closure member.

The invention is particularly applicable to cleaning appliances having at least one cyclonic separator. The separating apparatus may be releasably held on the main body. The first releasing means may also be employed by a user to release the separating apparatus from the main body. Alternatively, the separating apparatus may remain held to the main body, even when the collecting chamber is released from the separating apparatus.

BRIEF DESCRIPTION OF THE DRAWINGS

The invention will now be described, by way of example, with reference to the accompanying drawings, in which.

Like reference numerals refer to like parts throughout the specification.

DETAILED DESCRIPTION OF THE INVENTION

Figure 1A:
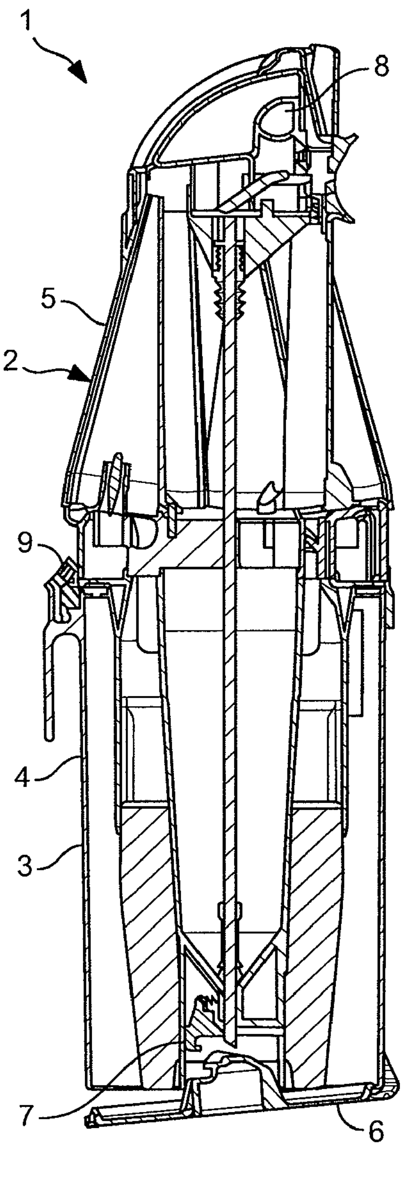
FIG. 1*a* is a sectional view of a conventional separating apparatus with the base of the collecting chamber in a first position.
Figure 1B:
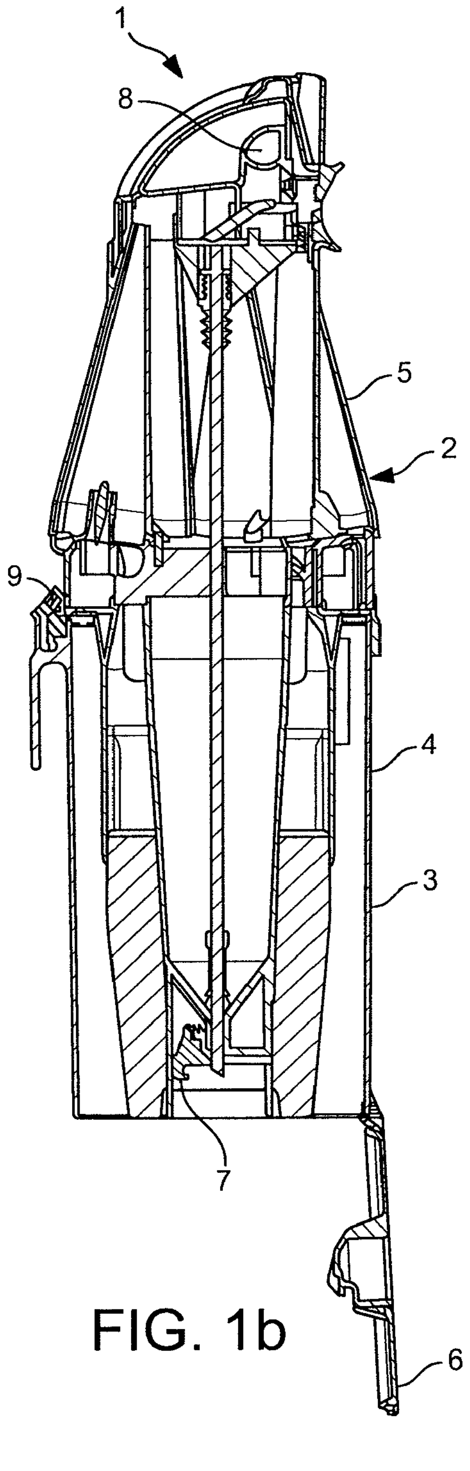
FIG. 1*b* is a sectional view of a conventional separating apparatus with the base of the collecting chamber in a second position.
Figure 2:
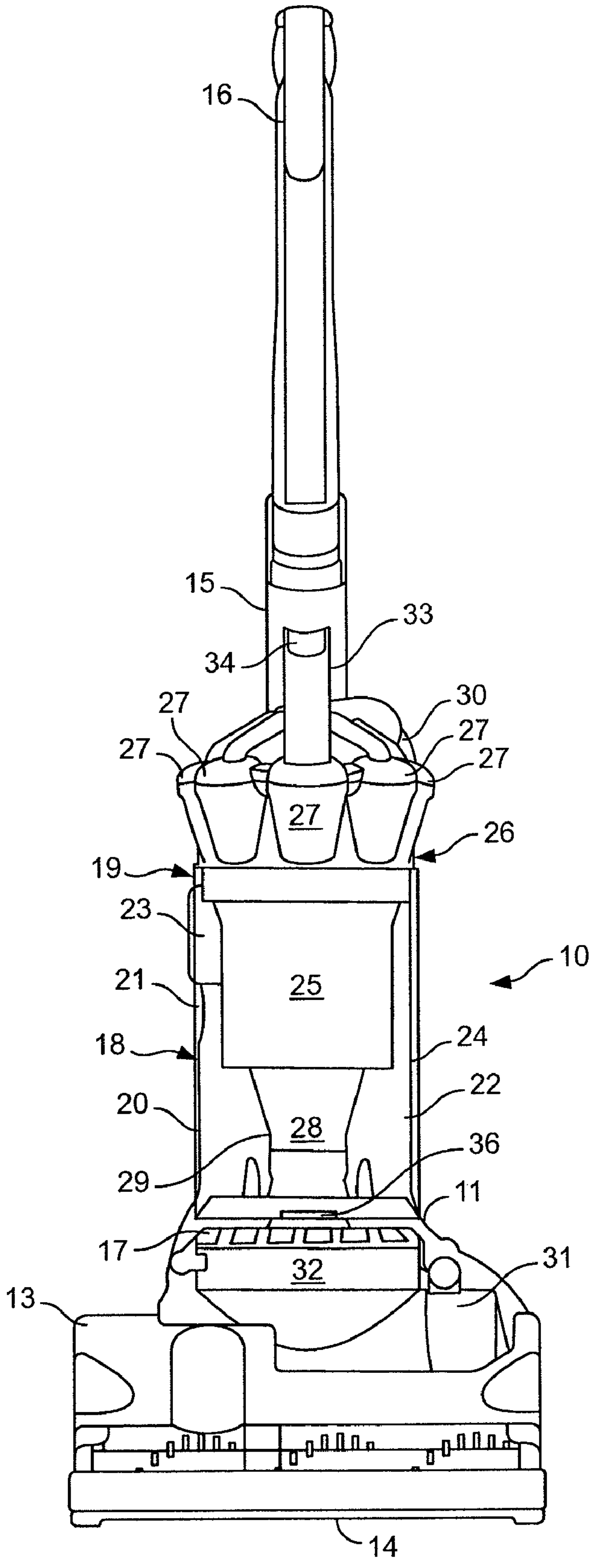
FIG. 2 is a front view of an upright vacuum cleaner incorporating separating apparatus according to the invention.
Figure 3B:
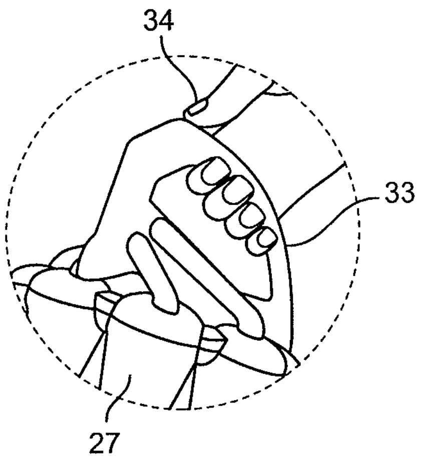
FIG. 3*b* is a magnified portion of the separating apparatus of FIG. 3*a;*
Figure 3A:
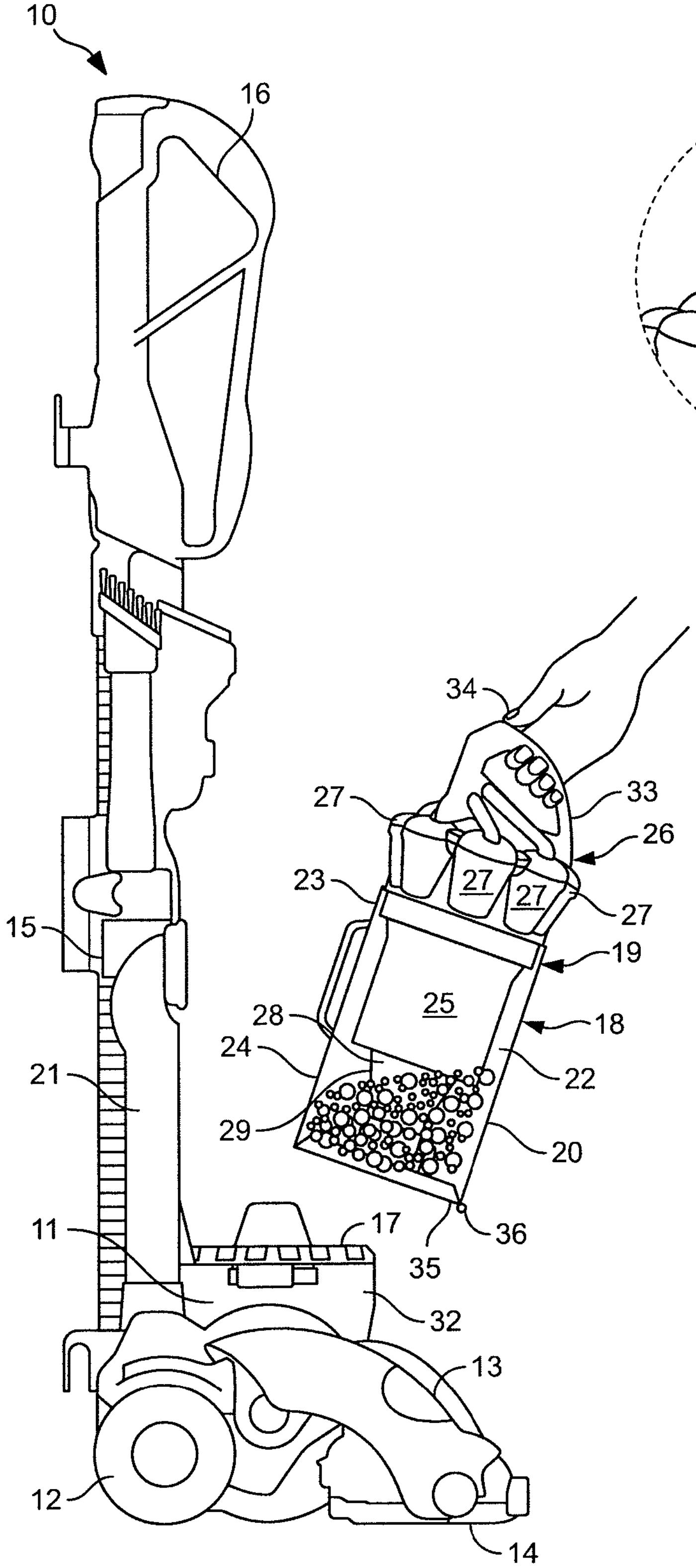
FIG. 3*a* is a side view of the cleaner of FIG. 1 showing the separating apparatus being removed.

With reference to FIGS. 2 and 3*a*, an upright vacuum cleaner is shown and indicated generally by the reference numeral 10. The vacuum cleaner 10 comprises a main body 11 which includes a motor and fan unit (not shown) and a pair 12 of wheels. A cleaner head 13 is pivotably mounted on the lower end of the main body 11 and a dirty air inlet 14 is provided in the underside of the cleaner head 13 facing the floor surface. The main body 11 further includes a spine 15 which extends vertically upward and merges into a hand grip 16. The hand grip 16 can be manipulated by a user to manoeuvre the vacuum cleaner 10 across a floor surface. The main body 11 further includes outlet ports 17 for exhausting air from the vacuum cleaner 10.

Separating apparatus 18 is releasably held on the main body 11 of the vacuum cleaner 10. The separating apparatus 18 comprises a separator 19 and a collecting chamber 20. The separating apparatus 18 is supported on the main body 11 above the outlet ports 17 and lies adjacent the spine 15. The interior of the separating apparatus 18 is in communication with the dirty air inlet 14 through ducting 21 adjacent the spine 15. The separating apparatus 18 can be removed from the main body 11 for emptying and for maintenance.

In use, the motor and fan unit draws dirty air into the vacuum cleaner 10 via the dirty air inlet 14. The dirty air is carried to the separating apparatus 18 via the ducting 21 adjacent the spine 15. The separating apparatus 18 includes an upstream cyclone 22 in the collecting chamber 20. An air inlet 23 is formed in the cylindrical side wall 24 of the chamber 20. When the separating apparatus 18 is held on the main body 11 of the vacuum cleaner 10, the air inlet 23 is in communication with the dirty air inlet 14 and forms a communication path between the ducting 21 adjacent the spine 15 and the interior of the upstream cyclone 22. The air inlet 23 is arranged tangentially to the upstream cyclone 22 so that the incoming air is encouraged to follow a helical path around the interior of the upstream cyclone.

A shroud 25 is located inwardly of the cylindrical wall 24 of the upstream cyclone 22. The shroud 25 comprises a cylindrical wall having a plurality of through-holes. The shroud 25 provides a communication path between the upstream cyclone 22 and a downstream cyclone assembly 26.

The downstream cyclone assembly 26 comprises a plurality of downstream cyclones 27 arranged in parallel. In this embodiment, seven downstream cyclones 27 are provided. Each downstream cyclone 27 is in communication with a downstream collector 28 forming part of the collecting chamber 20. The downstream collector 28 has a collector wall 29 located inwardly of the shroud 25. Each of the downstream cyclones 27 has a diameter smaller than that of the upstream cyclone 22. Therefore, the downstream cyclones 27 are able to separate smaller particles of dirt and dust from the partially-cleaned airflow than the upstream cyclone 22. Separated dirt and dust exits the downstream cyclones 27 and passes into the downstream collector 28.

Cleaned air then flows back up through the downstream cyclones 27 and enters a duct 30. The cleaned air then passes from the duct 30 sequentially through a pre-motor filter 31, the motor and fan unit, and a post-motor filter 32 before being exhausted from the vacuum cleaner 10 through the outlet ports 17.

A handle 33 is located over the separating apparatus 18 and is arranged to allow a user to carry the vacuum cleaner 10. When the separating apparatus 18 is released from the main body 11, as is shown in FIG. 3*a*, the handle 33 may also be used to carry the separating apparatus alone. With reference to FIG. 3*a*, a user-operable button 34 is located on the separating apparatus 18 at the upper end portion of the handle 33. By depressing the button 34, the user releases a catch holding the separating apparatus 18 to the main body 11. The user can then place the separating apparatus 18 over a suitable dirt and dust receptacle such as a dustbin for emptying of dirt and dust that has been collected in the collecting chamber 20.

Figure 4:
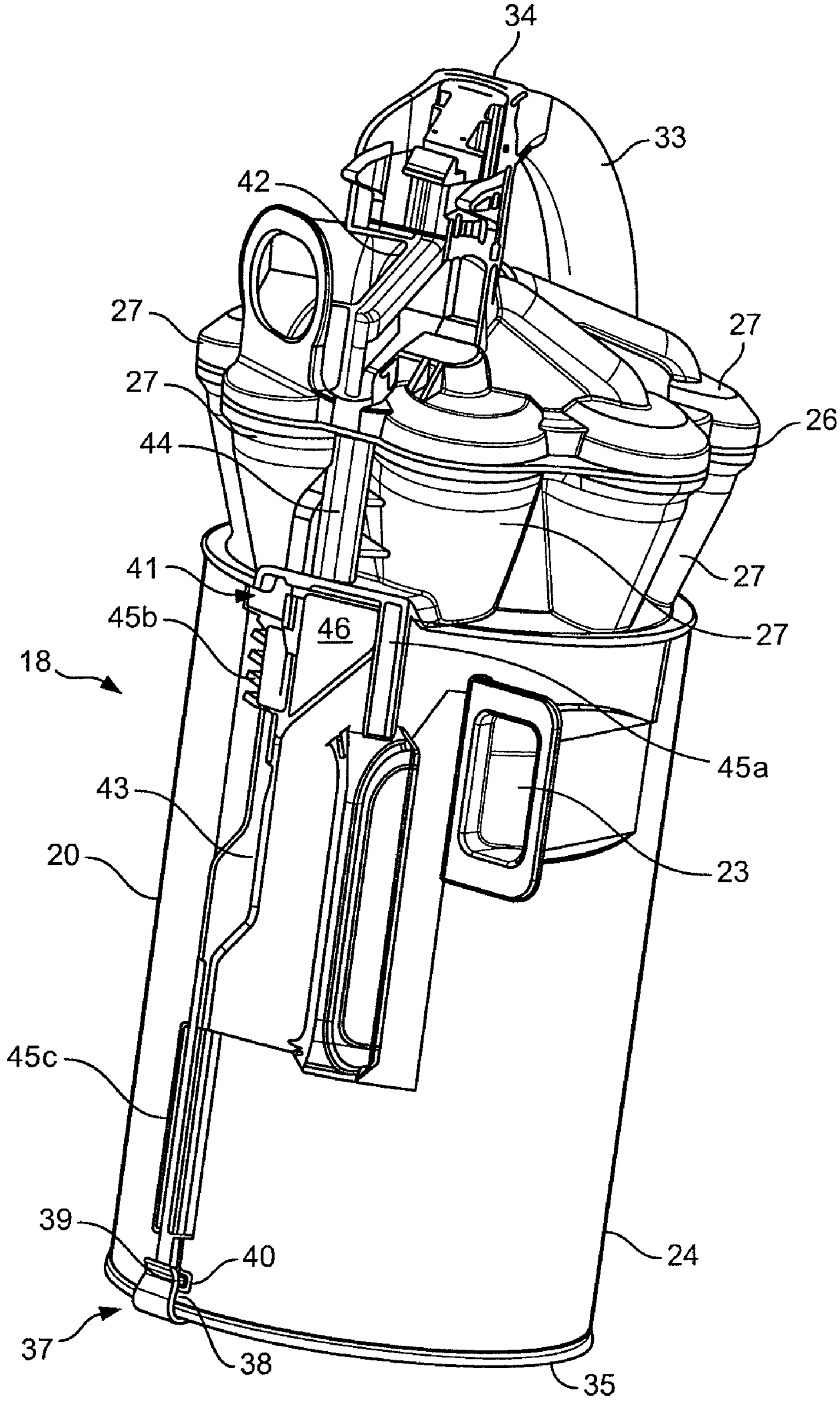
FIG. 4 is a rear perspective view of the separating apparatus of FIG. 2 showing the base of the collecting chamber in a closed position.
Figure 5:
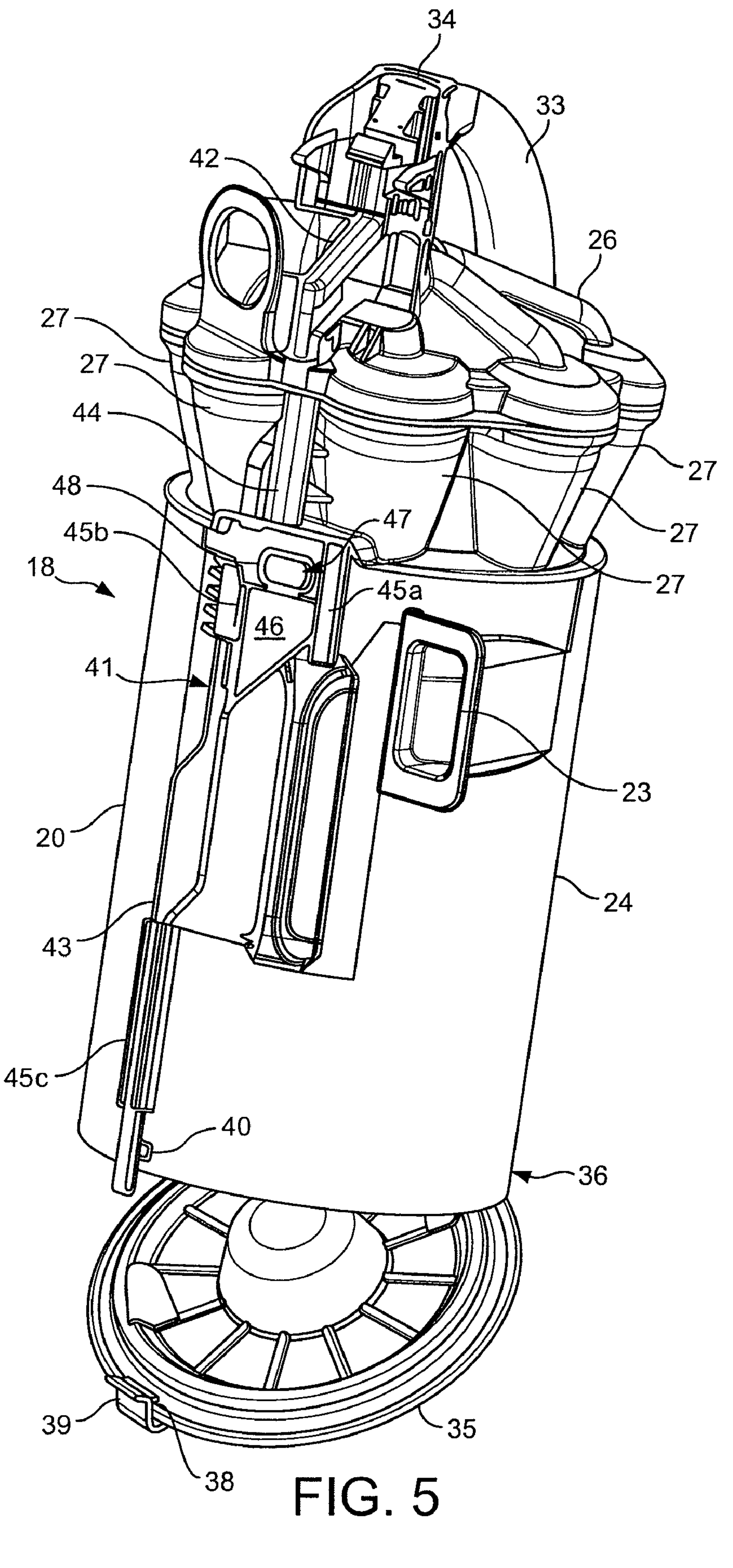
FIG. 5 is a rear perspective view of the separating apparatus of FIG. 2 showing the base of the collecting chamber in an open position.

Referring now to FIGS. 4 and 5, the collecting chamber 20 includes a closure member which, in this embodiment, comprises the base 35 of the collecting chamber. The base 35 is pivotably mounted on the lower end of the cylindrical side wall 24 by means of a hinge 36. The base 35 is retained in a closed position (as shown in FIG. 4) by means of a first catch 37. The first catch 37 includes a lug 38 and a flange 39. In this embodiment, the lug 38 and flange 39 are integral with the base 35 and extend from it. The lug 38 is inwardly directed and is received by a cooperating groove 40 formed in the external surface of the cylindrical side wall 24. The lug 38 is formed from a resilient material which biases the lug into the groove 40 when the base 35 is in the closed position. The flange 39 extends outwardly and upwardly from the lug 38.

The separating apparatus 18 further includes first releasing means in the form of an actuator 41. The actuator 41 comprises a first push member 42 and a second push member 43 which are generally in the form of elongated rods. The first push member 42 is arranged at the upper end of the rear of the separating apparatus 18, adjacent some of the downstream cyclones 27. The uppermost end portion of the first push member 42 includes the user-operable button 34 at the upper end of the handle 33. The button 34 is biased upwardly by a spring (not shown). The first push member 42 is arranged to be slideably movable by depression of the button 34 against the bias of the spring. The first push member 42 is supported by a guide 44 that constrains the first push member to slide in a generally vertical direction, namely towards the base 35 of the collecting chamber 20.

The second push member 43 is arranged on the lower portion of the rear of the separating apparatus 18, adjacent the collecting chamber 20. The second push member 43 is supported by a plurality of guides 45*a*, 45*b*, 45*c* that constrain the second push member 43 also to slide in a generally vertical direction. An upper portion of the second push member 43 comprises a cover 46 which, in this embodiment, takes the form of a triangular-shaped member which extends to one side of the elongate rod. A lower portion of the second push member has a thick dog-leg shape for increased robustness. The second push member 43 is not biased in any direction. The lower end portion of the second push member 43 is arranged to abut the flange 39 of the first catch 37. In this embodiment, the second push member 43 is interposed between the flange 37 and the wall 24 of the collecting chamber 20.

When a user decides to empty the collecting chamber 20 of the separating apparatus 18, he pushes the button 34 against the force of the spring, as shown in FIG. 3*b*. The guide 44 constrains the first push member 42 to slide downwardly towards the collecting chamber 20 into a lower second position. The lower end of the first push member 42 normally abuts the upper end of the second push member 43, and so the action of pushing down the first push member also urges the second push member downwardly into a lower second position. The bottom end of the second push member 43 is forced against the flange 39 of the first catch 37 and applies an outwardly-directed force to it. The lug 38, being integral with the flange 39, also experiences an outwardly-directed force, which force urges the lug 38 away from the groove 40. Thus, the first catch 37 holding the base 35 to the cylindrical side wall 24 of the collecting chamber 20 is released. The action of the second push member 43 against the flange 39 forces the base 35 to swing open on its hinge 36, as is shown in FIG. 5. The dirt and dust collected in the collecting chamber 20 can thus be emptied conveniently and efficiently. The upstream cyclone 22 and the downstream collector 28 are emptied simultaneously during this process.

When the user releases pressure on the button 34, the spring urges the button and the first push member 42 upwards into their original positions. The second push member 43 is not biased and so remains in its lower second position as shown in FIG. 4. In moving the second push member 43 from its original position to its lower position, the cover 46 associated with the second push member slides downwardly to reveal a second catch 47, which was concealed behind the cover. This second catch 47 holds the collecting chamber 20 to the separator 19.

Figure 6A:
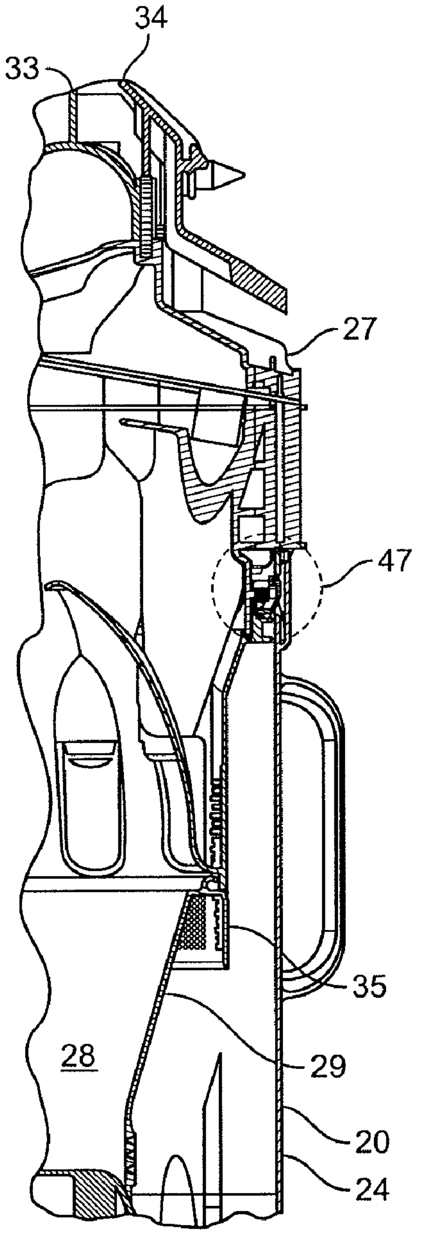
FIG. 6*a* is a sectional view of part of the separating apparatus of FIG. 2.
Figure 6B:
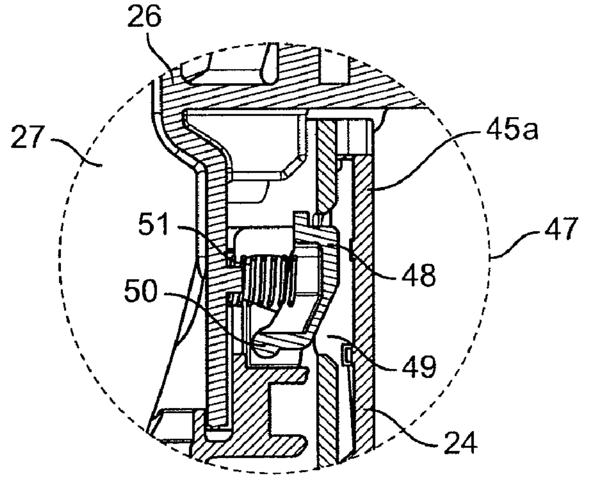
FIG. 6*b* is a magnified portion of part of FIG. 6*a;*
Figure 6C:
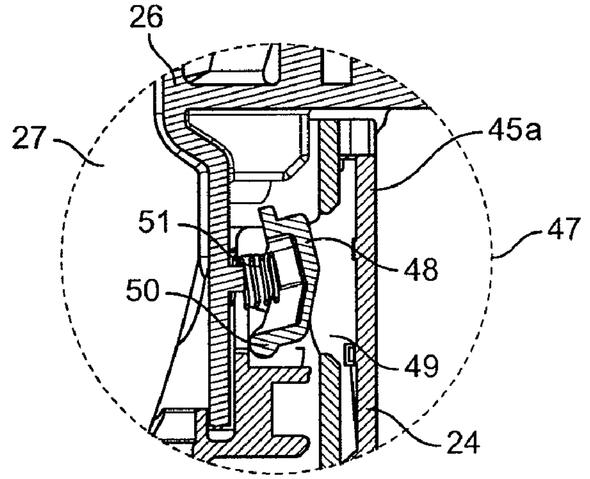
FIG. 6*c* is a view of the same part of the separating apparatus as is shown in FIG. 6*b* in a different position.

The second catch 47 is shown in more detail in FIGS. 6*b* and 6*c*. The second catch 47 comprises second releasing means in the form of a user-operable button 48 on separator 19, close to the downstream cyclones 27, which button engages with an aperture 49 in an upper region of the cylindrical side wall 24 of the collecting chamber 20. The button 48 is pivotably attached to the separator 19 by means of a hinge 50 that extends along its lower portion. The button 48 is based outwardly by means of a spring 51. When the separator 19 and collecting chamber 20 are attached, the button 48 extends outwardly though the aperture 49 in the upper portion of the side wall 24 of the collecting chamber 20. The button 48 stands proud of the side wall 24 so as to be conspicuous to, and easily manipulated by, the user. The button 48 comprises part of the second catch 47 but is also the releasing means for this catch.

Figure 7:
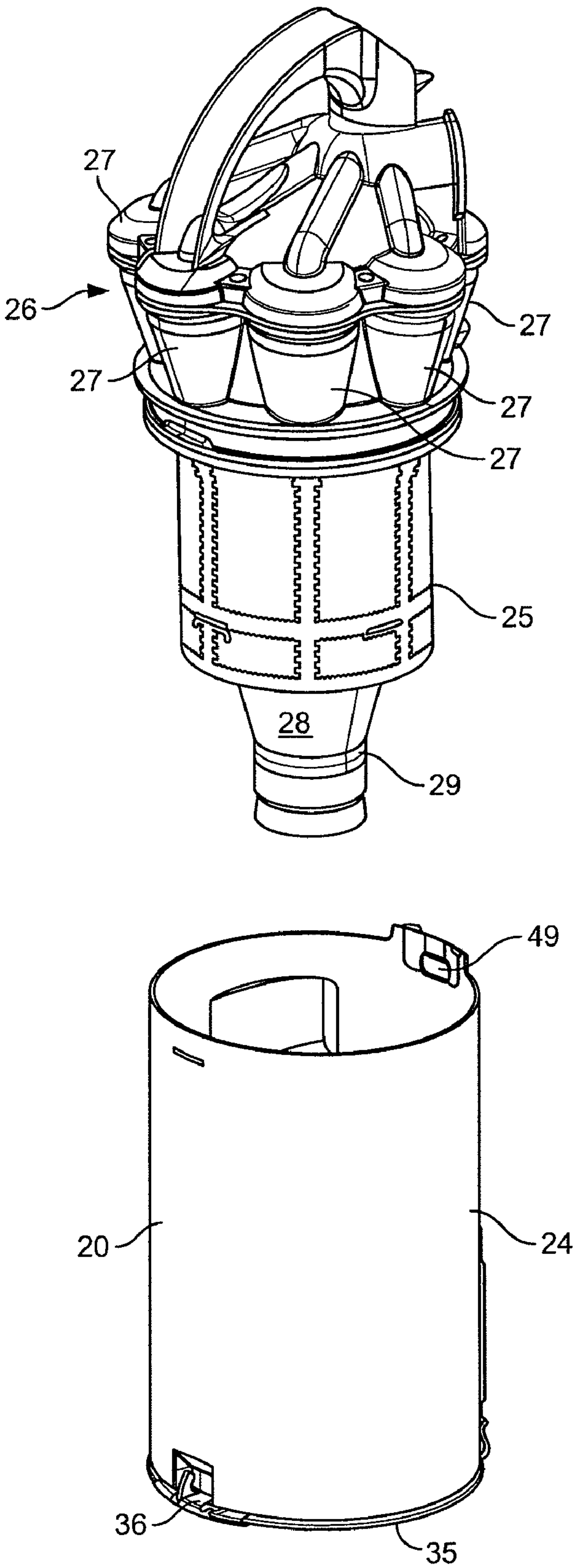
FIG. 7 is a rear perspective view of the separating apparatus of FIG. 2 with the separator and collecting chamber detached from one another.

The user may wish to separate the collecting chamber 20 and the separator 19 for the purpose of, for example, clearing large clumps of dirt or foreign objects that may have entered the cyclonic separator 19, to wipe hair and fibres from the shroud 25, to wash the collecting chamber or to repair or replace the collecting chamber or the separator. In order to detach the collecting chamber 20 from the separator 19, the user depresses the button 48 that forms the second releasing means against the force of the spring 51. The button 48 is caused to pivot inwardly by means of hinge 50 until it is clear of the side wall 24 of the collecting chamber 20, at which point the collecting chamber and the separator 19 may be disengaged from one another. FIG. 7 shows the separator 19 and the collecting chamber 20 separated from each other.

This configuration of the catches 37, 47 prohibits the user from releasing the second catch until the first catch has been released. This makes the apparatus intuitive to use: the button 48 for the second catch 47 is normally concealed by the cover 46, and is revealed only by operation of the first catch 37, which moves the cover. Thus, the user instinctively empties the collecting chamber 20 before detaching the chamber from the separator 19. The catches 37, 47 are releasable only according to a predetermined sequence: namely, the first catch followed by the second catch. When the user wishes to re-assemble the apparatus, there is no sequence for locking the catches 37, 47; they may be re-engaged in either order.

For example, when the user is ready to re-assemble the separating apparatus 18, he may decide firstly to close the collecting chamber 20 by manually moving the base 35 back into the closed position. The side wall 24 of the collecting chamber 20 bears against the flange 39, causing it to flex outwardly so that the flange and lug 38 slide against the outer surface of the side wall 24 as the base 35 is pushed towards its closed position. The flange 39 and lug 38 are biased inwardly so that, when the lug reaches the groove 40 in the side wall 24 of the collecting chamber 20, it slots into the groove, re-engaging the first catch 37. The second push member 43 is urged by the flange 39 into its first, higher position in which the cover 46 lies over the aperture 49 in the side wall 24 of the collecting chamber 20. The user can then bring the separator 19 and the collecting chamber 20 together again. In fact, the arrangement of the invention assists the user in re-attaching the separator 19 and collecting chamber 20, as the button 48 and the cover 46 are conspicuous visual indicators of the correct orientation of the separator with respect to the collecting chamber. As the user pushes the separator 19 and collecting chamber 20 together, the side wall 24 of the collecting chamber pushes the button 48 inwardly so that the button slides against the inner surface of the side wall. The force of the spring 51 acting on the button 48 urges it through the aperture 49 on the side wall 24 of the collecting chamber 20 as the chamber and separator 19 are pushed together, thereby re-engaging the second catch 47.

Alternatively, the user may firstly re-attach the collecting chamber 20 to the separator 19, which action re-engages the second catch 47. Then, the user may push the base 35 into its closed position, and in doing so, re-engage the first catch 37.

The invention is not limited to the detailed description given above. Variations will be apparent to the person skilled in the art. For example, the cover 46 obscuring the second catch 47 has been shown as part of the first push member 42 employed to actuate the first catch 37. However, the cover 46 may instead be part of another component associated with the first catch 37—for example, the second push member 43, the button 34 or the lug 38 or flange 39.

Alternatively, the second catch may be hidden or made inaccessible by something other than a component associated with the first catch. Such an arrangement is shown in FIGS. 8 to 11, which show a vacuum cleaner in the form of a hand-held vacuum cleaner.

Figure 8:
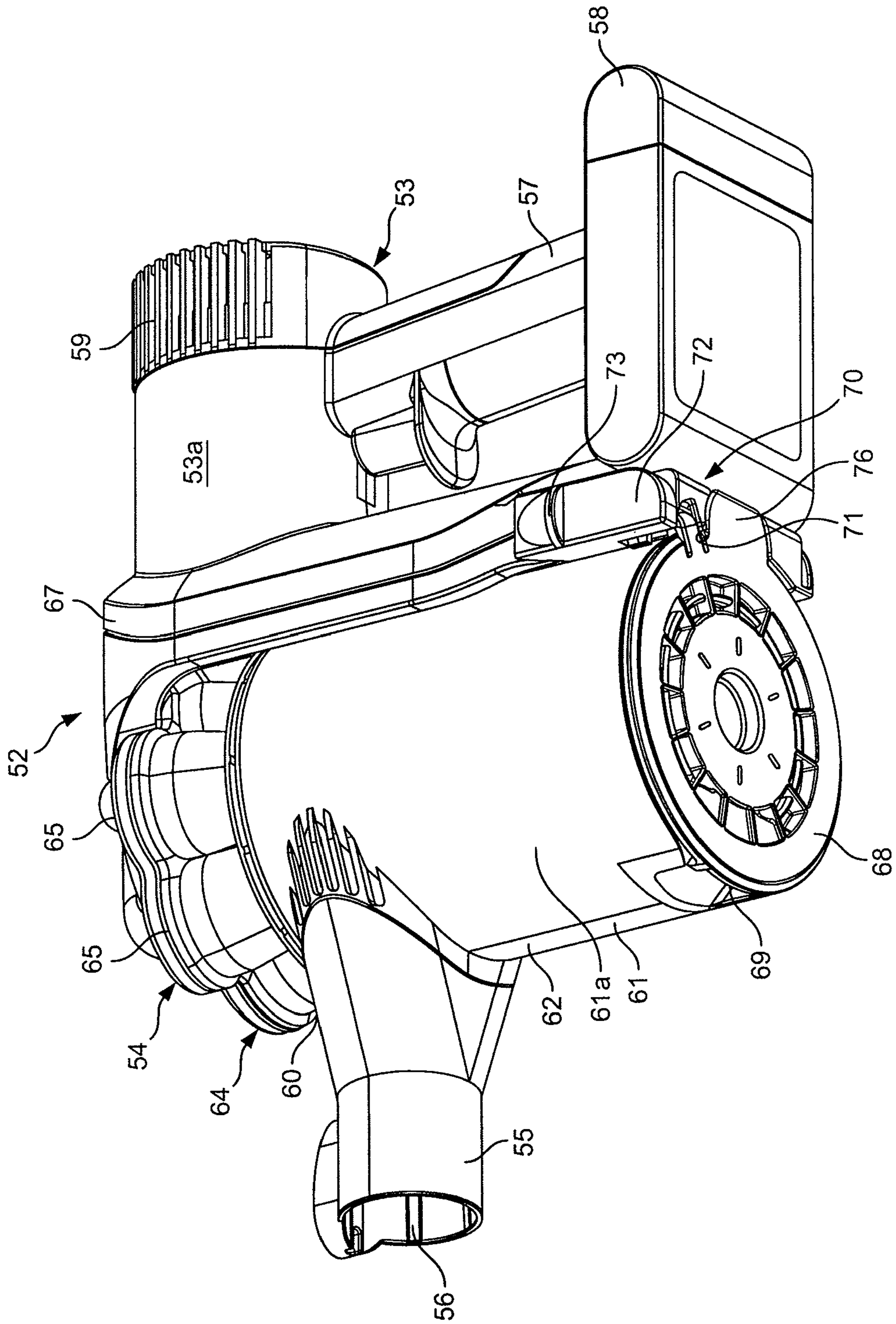
FIG. 8 is a perspective view from underneath of a handheld vacuum cleaner incorporating separating apparatus constructed according to an alternative embodiment of the invention.

With reference to FIG. 8, the hand-held vacuum cleaner 52 comprises a main body 53 which includes a motor and fan unit 53*a*. Separating apparatus 54 is held on the main body 53. A forwardly-directed nozzle 55 is rigidly mounted to the front of the separating apparatus 54. A dirty air inlet 56 is provided at the end of the nozzle 55, which forms an airflow path between the dirty air inlet and the separating apparatus 54. The main body 53 further includes a hand grip 57, which can be employed by a user to manoeuvre and manipulate the vacuum cleaner 52. The hand grip 57 is at the rear of the vacuum cleaner 52, and extends transversely between the motor and fan unit 53*a* and a battery pack 58 at the base of the vacuum cleaner 52. The battery pack 58 provides power for the motor of the motor and fan unit 53*a*. The main body 53 further includes outlet ports 59 for exhausting air from the vacuum cleaner 52.

The separating apparatus 54 comprises a separator 60 and a collecting chamber 61. In use, the motor and fan unit 53*a* draws dirty air into the vacuum cleaner 52 via the dirty air inlet 56. The dirty air is carried to the separating apparatus 54 via the nozzle 55. The separating apparatus 54 includes an upstream cyclone 62 in the collecting chamber 61. Incoming air is encouraged to follow a helical path around the interior of the upstream cyclone 62. A shroud 63 (FIGS. 9 and 11) is located in the upstream cyclone 62. The shroud 63 comprises a cylindrical wall having a plurality of through-holes located inwardly of the cylindrical side wall 61*a* of the collecting chamber. The shroud 63 provides a communication path between the upstream cyclone 62 and a downstream cyclone assembly 64.

The downstream cyclone assembly 64 comprises a plurality of downstream cyclones 65 arranged in parallel. Each downstream cyclone 65 is in communication with a downstream collector 66 (FIGS. 9 and 11) forming part of the collecting chamber 61. Each of the downstream cyclones 65 has a diameter smaller than that of the upstream cyclone 62. Therefore, the downstream cyclones 65 are able to separate smaller particles of dirt and dust from the partially-cleaned airflow than the upstream cyclone 62. Separated dirt and dust exits the downstream cyclones 65 and passes into the downstream collector 66. Cleaned air then flows back up through the downstream cyclones 65 and passes sequentially through a pre-motor filter 67 and the motor and fan unit 53*a* before being exhausted from the vacuum cleaner 52 through the outlet ports 59.

Figure 9:
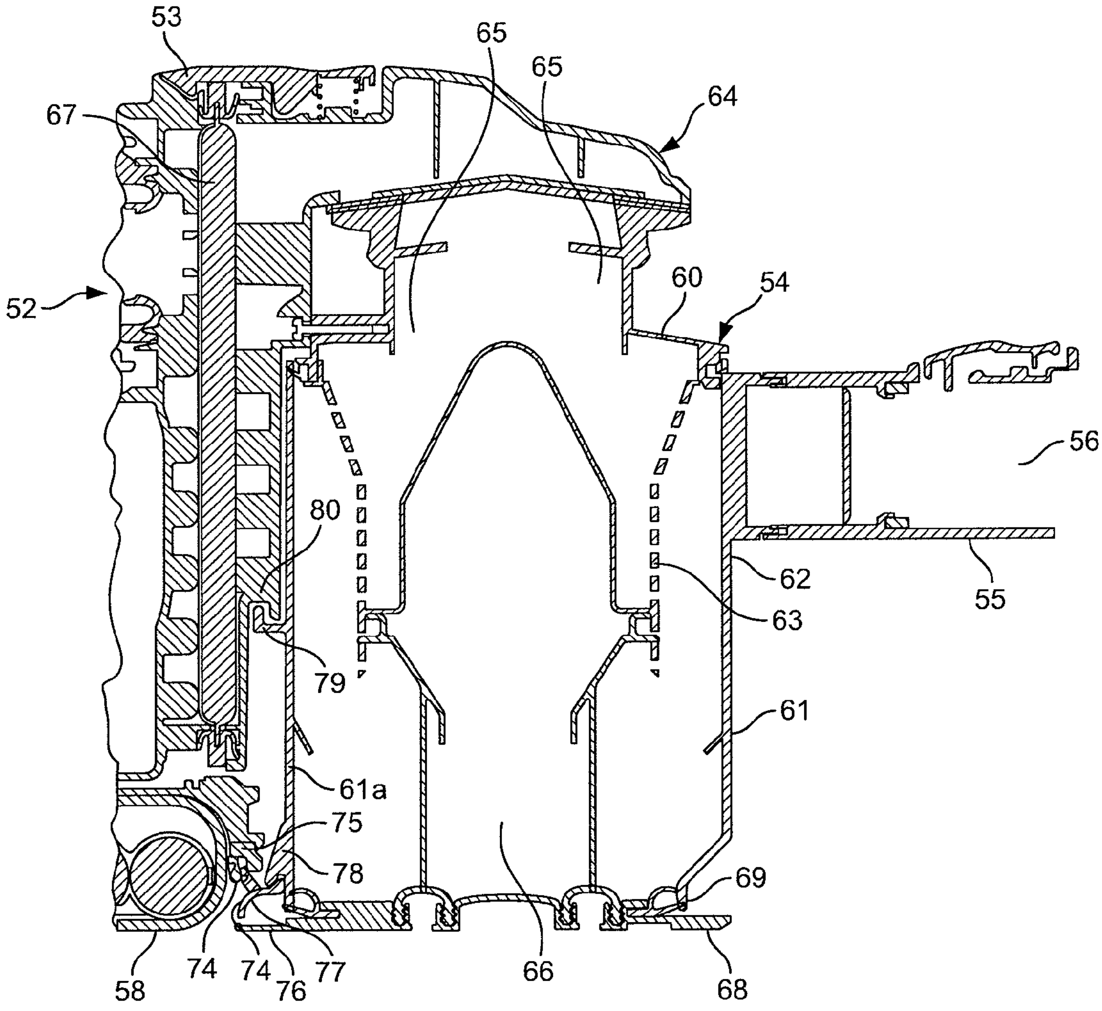
FIG. 9 is a sectional side view of part of the vacuum cleaner of FIG. 8.

The collecting chamber 61 includes a closure member which, in this embodiment, comprises the base 68 of the collecting chamber. The base 68 is pivotably mounted on the lower end of the side wall 61*a* of the collecting chamber 61 by means of a hinge 69. The base 68 is retained in a closed position (as shown in FIGS. 8 and 9) by means of a first catch 70. The first catch 70 includes a flange 71 which, in this embodiment, is integral with the base 68 and extends from it. The flange 71 has a first portion that extends upwardly and inwardly so that it bears against the external surface of the side wall 61*a* when the base 68 is in the closed position. A second portion of the flange 71 extends outwardly and upwardly from the first portion.

The main body 53 of the vacuum cleaner 52 further includes first releasing means in the form of an actuator 72. The actuator 72 comprises a user-operable push member, which incorporates an integral elongated rod, not visible in these drawings. The actuator 72 is arranged on one side of the main body 53 adjacent the collecting chamber 61. The actuator 72 is arranged to be slideably movable by a user pushing against a lip 73 extending outwardly from the actuator. The actuator 72 is constrained to slide in a generally vertical direction, namely towards the base 68 of the collecting chamber 61.

Figure 10:
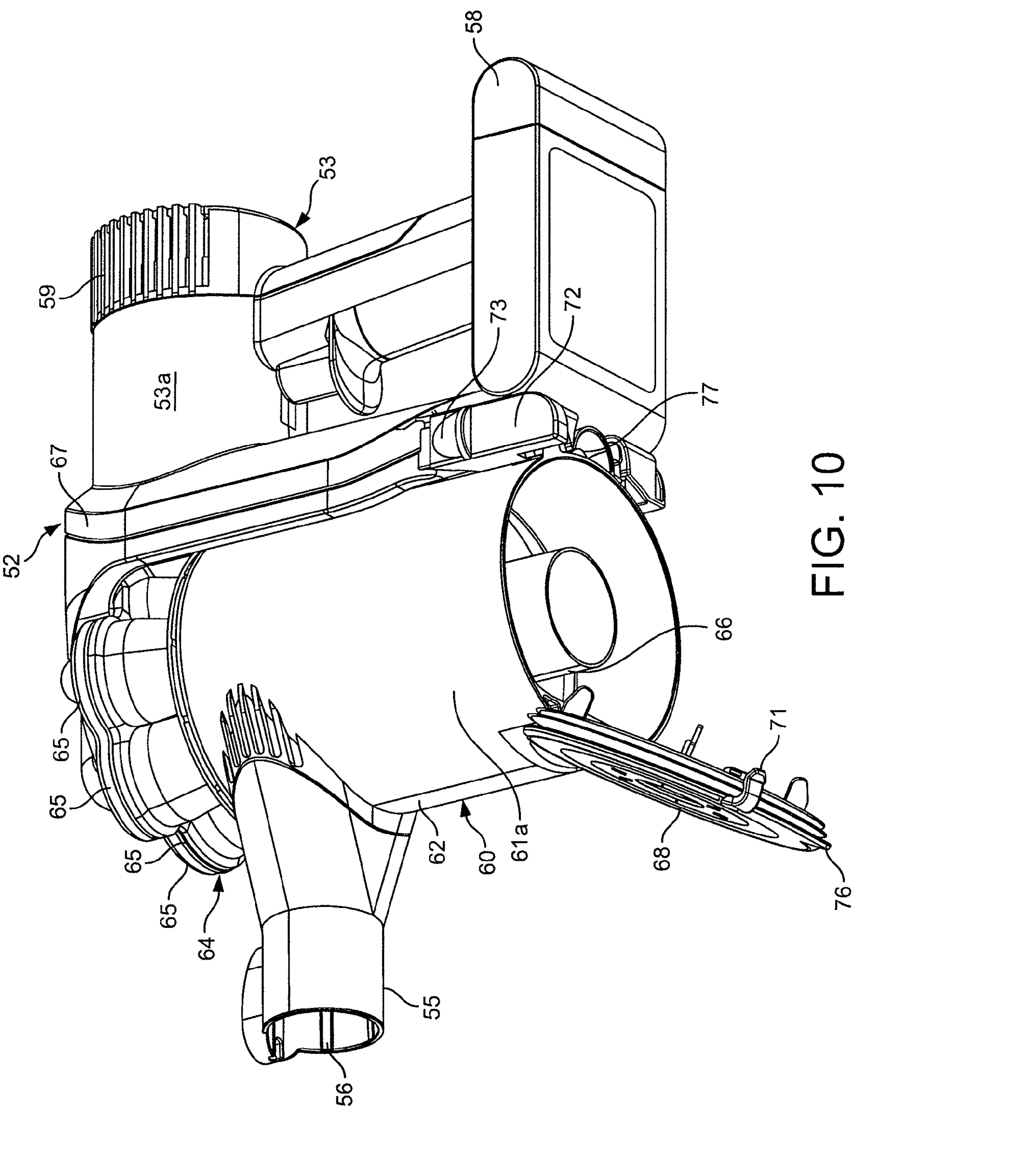
FIG. 10 is a perspective view from underneath of the vacuum cleaner of FIG. 8, with the base of the collecting chamber in an open position.
Figure 11:
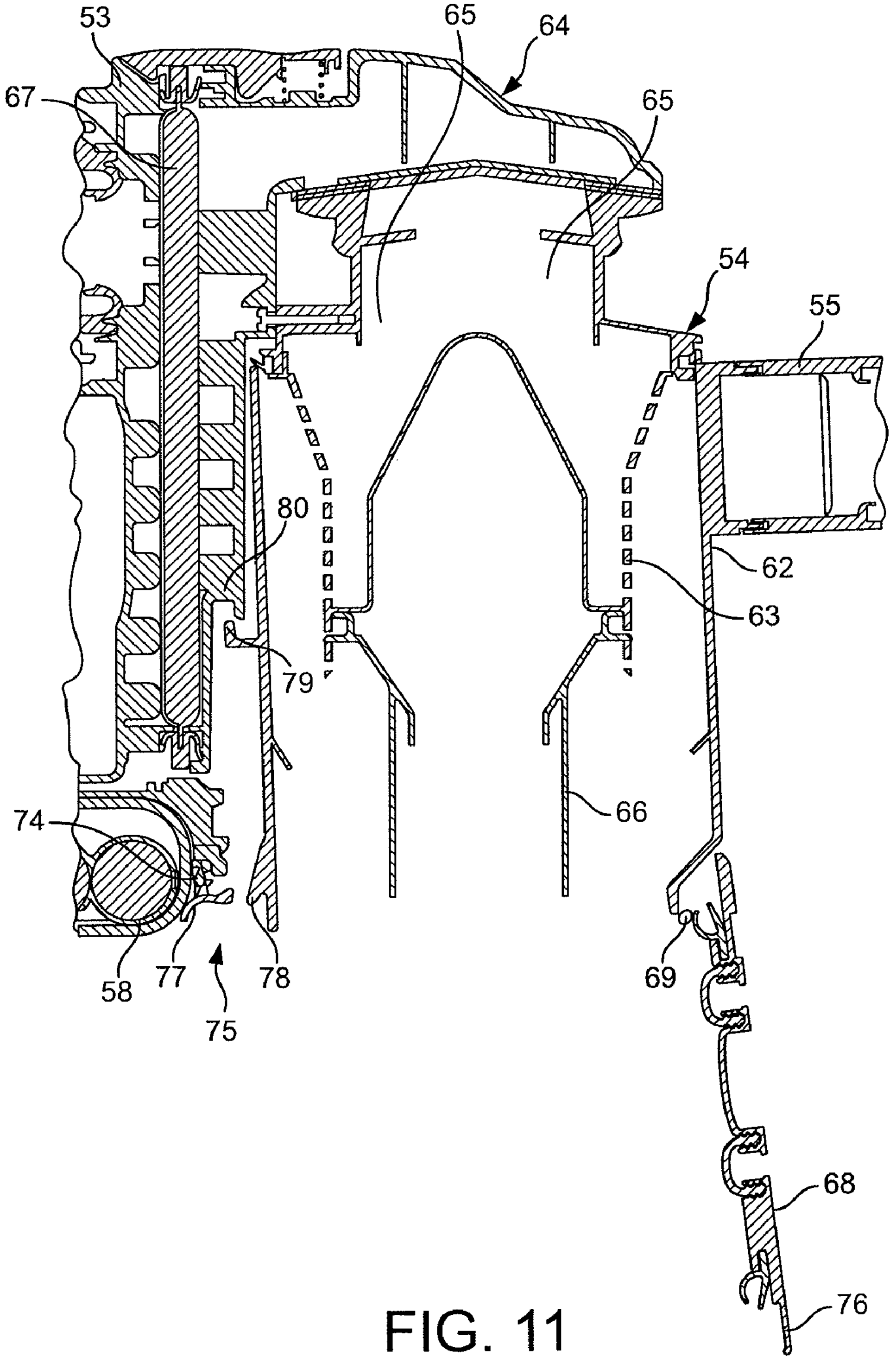
FIG. 11 is a sectional side view of part of the vacuum cleaner of FIG. 8, with both first and second catches disengaged.

When a user decides to empty the collecting chamber 61 of the separator 60, he pushes downwardly the lip 73 of the actuator 72. In doing so, the push-rod of the actuator 72 is forced against the flange 71 and applies an outwardly-directed force to it so that it moves away from, and out of engagement with, the side wall 61*a*. Thus, the first catch 70 holding the base 68 to the collecting chamber 61 is released. The action of releasing the first catch causes the base 68 to swing open on its hinge 69, as is shown in FIG. 10. The dirt and dust collected in the collecting chamber 61 can thus be emptied conveniently and efficiently. The upstream cyclone 62 and the downstream collector 66 are emptied simultaneously during this process.

When the base 68 is in the open position, a second actuator 74 comprising releasing means for a second catch 75 is revealed. The second actuator 74 had previously been concealed and rendered inaccessible by a flap 76 comprising an extension of part of the base 68. This second catch 75 holds the collecting chamber 61 to the separator 60.

The second actuator 74 comprises a second user-operable button 77, which is pivotably attached to the main body 53 of the hand-held vacuum cleaner 52. The button 77 is located behind the collecting chamber 61 and faces downwardly towards the base of the vacuum cleaner 52. The second actuator 74 forms part of the second catch 75. The uppermost surface of the button 77 of the second actuator 74 engages with a first hook 78 that protrudes from the rear of the side wall 61*a* of the collecting chamber 61. The second actuator 74 and first hook 78 together form the second catch 75. Further up the side wall 61*a* protrudes a second hook 79, which extends upwardly and engages with a recess 80 on the main body 53 close to the pre-motor filter 67. When the first hook 78 engages with the button 77, and the second hook 79 engages with the recess 80, the collecting chamber 61 is held securely on the main body 53.

When the user wishes to separate the collecting chamber 61 from the separator 60 and the rest of the vacuum cleaner 52 for the purpose of, for example, cleaning the collecting chamber, the user presses the button 77 that forms part of the second releasing means. The button 77 pivots outwardly until it is clear of the first hook 78 on the side wall 61*a* of the collecting chamber 61, at which point the collecting chamber may be moved outwardly and downwardly with respect to the main body 53. This action releases the second hook 79 from the recess 80, and so the separator 60 on the main body 52 and the collecting chamber 61 can be separated from each other.

The invention has been described with reference to part of the second catch itself being revealed by the action of releasing the first catch: however, a separate actuator for the second catch may be provided and this actuator may be the component that is obscured, and then revealed by operation of the first catch.

The separating apparatus need not be a cyclonic separator. Other forms of separating apparatus could be used, for example, a porous bag or filter. Additionally, the separating apparatus need not be located in the collecting chamber. A separate collecting chamber may be provided. What is important is that the collecting chamber collects dirt and dust which is then emptied by the user.

A part of the collecting chamber other than the base of the collecting chamber may be movable for emptying purposes. Other forms, arrangements and locations of closure members may be used. For example, the side or top of the collecting chamber may be movable. Further, the closure member need not be pivotable. Other opening arrangements for the closure member may be used; for example, sliding, retracting or rotating closure members.

The cleaning appliance need not be an upright vacuum cleaner or a hand-held vacuum cleaner. The invention is applicable to other types of vacuum cleaner, for example, cylinder machines and stick-vacuums. Further, the present invention is applicable to other types of cleaning appliances, for example, a wet and dry machine or a carpet shampooer.

The invention claimed is:

1. A separating apparatus for a cleaning appliance, comprising a separator for separating dirt and dust from a fluid flow and a collecting chamber arranged to collect dirt and dust separated by the separator, a first catch for opening a closure member on the collecting chamber, a first releasing mechanism arranged to be capable of releasing the first catch, a second catch for releasing the collecting chamber from the separator and a second releasing mechanism arranged to be capable of releasing the second catch, in which the second releasing means is inaccessible when the first catch is engaged.

2. The separating apparatus as claimed in claim 1, in which the second releasing mechanism is configured to be at least partially obscured when the first catch is engaged.

3. The separating apparatus as claimed in claim 1 or 2, in which the second releasing mechanism is made inaccessible or is obscured by the first releasing mechanism.

4. The separating apparatus as claimed in claim 2, in which the first releasing mechanism is arranged to move from a first position, in which the first releasing mechanism obscures the second releasing mechanism, to a second position in which the second releasing mechanism is accessible and visible.

5. The separating apparatus as claimed in claim 1 or 2, in which the second releasing mechanism is made inaccessible or is obscured by part of the collecting chamber.

6. The separating apparatus as claimed in claim 5, in which the second releasing mechanism is made inaccessible or is obscured by part of the closure member.

7. The separating apparatus as claimed in claim 1 or 2, in which the first and second catches are spaced from one another.

8. The separating apparatus as claimed in claim 1 or 2, in which the first releasing mechanism comprises a manually operable actuating member which is located remotely from the closure member and wherein the first releasing mechanism is configured to operate to apply an opening force to the closure member.

9. The separating apparatus as claimed in claim 8, in which the first releasing mechanism comprises a push rod which is movable to firstly release the first catch and secondly to exert the opening force on the closure member.

10. The separating apparatus as claimed in claim 1 or 2, in which the closure member is attached by a pivot to the collecting chamber and the first releasing mechanism is configured to operate to apply an opening force to the closure member at a position which is spaced from the pivot.

11. The separating apparatus as claimed in claim 1 or 2, in which the second releasing mechanism comprises a user-operable button.

12. The separating apparatus as claimed in claim 1 or 2, in which the collecting chamber comprises a cyclonic separator.

13. A cleaning appliance comprising the separating apparatus as claimed in claim 1 or 2.

14. The cleaning appliance as claimed in claim 13, further comprising a main body, the separating apparatus being releasably held on the main body.

15. The cleaning appliance as claimed in claim 14, in which the separating apparatus is configured to be releasable from the main body by operating the first releasing mechanism.

16. The cleaning appliance as claimed in claim 13, in which the separating apparatus is held on the main body when the collecting chamber is released from the separating apparatus.

* * * * *